US007152392B2

(12) United States Patent
Kuboshima et al.

(10) Patent No.: US 7,152,392 B2
(45) Date of Patent: Dec. 26, 2006

(54) EXHAUST GAS CLEANING SYSTEM FOR INTERNAL COMBUSTION ENGINE

(75) Inventors: Tsukasa Kuboshima, Okazaki (JP); Shinichiro Okugawa, Toyota (JP); Masumi Kinugawa, Okazaki (JP); Kiyonori Sekiguchi, Okazaki (JP)

(73) Assignee: Denso Corporation, Kariya (JP)

( * ) Notice: Subject to any disclaimer, the term of this patent is extended or adjusted under 35 U.S.C. 154(b) by 399 days.

(21) Appl. No.: 10/676,259

(22) Filed: Oct. 2, 2003

(65) Prior Publication Data

US 2004/0123586 A1 Jul. 1, 2004

(30) Foreign Application Priority Data

Oct. 3, 2002 (JP) ............................ 2002-291503

(51) Int. Cl.
*F01N 3/00* (2006.01)
*F01N 3/02* (2006.01)

(52) U.S. Cl. ........................... 60/277; 60/285; 60/297; 60/311

(58) Field of Classification Search ................. 60/277, 60/282, 285, 295; 73/118.1
See application file for complete search history.

(56) References Cited

U.S. PATENT DOCUMENTS 4,656,829 A * 4/1987 Creps et al. .................. 60/277
5,104,627 A * 4/1992 Usui et al. .................. 422/171
5,211,010 A 5/1993 Hirota
5,325,664 A * 7/1994 Seki et al. .................... 60/276
5,390,489 A * 2/1995 Kawai et al. ................. 60/276
5,548,514 A * 8/1996 Hasegawa et al. .......... 701/103
6,079,203 A * 6/2000 Wakamoto ................... 60/274
2002/0099494 A1* 7/2002 Wada ......................... 701/114

FOREIGN PATENT DOCUMENTS

JP 2593506 12/1996

* cited by examiner

*Primary Examiner*—Thomas Denion
*Assistant Examiner*—Loren C Edwards
(74) *Attorney, Agent, or Firm*—Nixon & Vanderhye, P.C.

(57) ABSTRACT

A diesel particulate filter (DPF) having an oxidation catalyst is disposed between exhaust pipes of an internal combustion engine. An exhaust gas temperature sensor senses outlet gas temperature of the DPF. An engine control unit (ECU) calculates estimated central temperature of the DPF from an output of the exhaust gas temperature sensor with the use of an inverse transfer function of a change in the outlet gas temperature with respect to a change in temperature of the DPF. Based on the estimated temperature, the ECU performs excessive temperature increase prevention control or regeneration control of the DPF. The transfer function is simply expressed with first-order lag and dead time. A time constant of the first-order lag and the dead time are set in accordance with an exhaust gas flow rate.

16 Claims, 8 Drawing Sheets

EXHAUST GAS CLEANING SYSTEM FOR INTERNAL COMBUSTION ENGINE

CROSS REFERENCE TO RELATED APPLICATION

This application is based on and incorporates herein by reference Japanese Patent Application No. 2002-291503 filed on Oct. 3, 2002.

BACKGROUND OF THE INVENTION

1. Field of the Invention

The present invention relates to an exhaust gas cleaning system for an internal combustion engine having an exhaust gas after-treatment device. Specifically, the present invention relates to the exhaust gas cleaning system for the internal combustion engine capable of estimating temperature of the exhaust gas after-treatment device and maintaining the exhaust gas after-treatment device in an optimum state, based on the estimated temperature.

2. Description of Related Art

Conventionally, as means for protecting the environment, various exhaust gas after-treatment devices for reducing air pollutants discharged from an internal combustion engine are proposed. For instance, catalyst systems such as an oxidation catalyst, a NOx removal catalyst and a three-way catalyst have been introduced progressively. Emission of particulate matters included in exhaust gas of a diesel engine is a problem to be solved. Therefore, introduction of a diesel particulate filter (DPF) or a DPF in which a catalyst is supported has been considered. The DPF collects the particulate matters and eliminates the collected particulate matters regularly by combustion.

Temperature control of the exhaust gas after-treatment device is an important factor for efficient operation of the device. Specifically, in the case where the catalyst is employed, the device should be used in a certain operating temperature range (for instance, 200–700° C.) in order to operate the device above a predetermined activation temperature, above which the catalyst is activated sufficiently, and meanwhile, to prevent damage to the catalyst caused by excessive temperature increase. For instance, the DPF is regenerated by heating the DPF above 600° C. with the use of unburned hydrocarbon, which is supplied by performing post-injection and the like. However, under some conditions, there is a possibility that the DPF may be heated excessively with combustion heat of the particulate matters. As a result, the catalyst may be degraded or a filter base material may be damaged.

A method for detecting a state of the catalyst by sensing the temperature of the after-treatment device is proposed, for instance, as disclosed in Japanese Patent Unexamined Publication No. H04-224221 (a first patent document) or Japanese Patent No. 2593506 (a second patent document). In the first patent document, temperature sensing means disposed in an exhaust gas cleaning system having a NOx reduction catalyst is disclosed. The exhaust gas cleaning system controls the temperature of the catalyst within a certain temperature range by changing an excess air ratio in accordance with the sensed temperature. In the second patent document, first and second temperature sensing means disposed upstream and downstream of the catalyst respectively are disclosed. Output signals from the first and second temperature sensing means are compared with each other in order to determine degradation of the catalyst.

The state of the exhaust gas after-treatment device such as the catalyst or the DPF is most suitably represented by temperature at a center of the device. However, as a matter of fact, it is difficult to directly sense the temperature at the center of the device. Therefore, in conventional devices, temperature of the exhaust gas upstream or downstream of the exhaust gas after-treatment device is regarded as the temperature of the device. For instance, in the first patent document, the temperature of the catalyst is controlled based on an assumption that the temperature of the exhaust gas flowing out of the catalyst coincides with the temperature of the catalyst. However, when a vehicle is accelerated or decelerated, the temperature of the exhaust gas flowing out of the catalyst does not coincide with the temperature of the catalyst necessarily. As a result, the temperature of the catalyst cannot be maintained in a proper range.

It is because a catalyst support or a filter base material is ordinarily formed of a ceramic honeycomb structural body, which has a large heat capacity. Since the catalyst support or the filter base material is formed of the ceramic honeycomb structural body, there is time lag since the temperature at the center of the device changes until the change in the temperature at the center of the device is reflected in the temperature of the exhaust gas downstream of the device. In addition, estimated temperature may deviate from actual temperature largely because of catalytic reaction or combustion of the particulate matters. In that case, there is a possibility that the catalyst may be degraded.

In the determination of the degradation of the catalyst disclosed in the second patent document, it is difficult to determine whether a difference between outputs of the two temperature sensing means is a temperature change caused by the catalytic reaction or a change in the temperature of the exhaust gas itself (a change in the temperature of the exhaust gas before entering the exhaust gas after-treatment device). It is because the temperature of the exhaust gas itself changes with the acceleration or the deceleration of the vehicle. Therefore, in that method, the degradation determination can be performed only while the vehicle is not traveling or while the vehicle is traveling at a constant speed. However, in the actual travel, the vehicle travels at a constant speed infrequently. Therefore, there is a practical problem in the above method.

SUMMARY OF THE INVENTION

It is therefore an object of the present invention to provide an exhaust gas cleaning system for an internal combustion engine capable of accurately sensing temperature at a center of an exhaust gas after-treatment device such as a catalyst or a DPF and performing temperature control of the catalyst or regeneration control of the DPF, or deterioration determination based on the sensed temperature. Thus, a highly safe, sophisticated and credible exhaust gas cleaning system can be provided.

According to an aspect of the present invention, an exhaust gas cleaning system for an internal combustion engine has an exhaust gas after-treatment device, outlet gas temperature sensing means, temperature estimating means and state detecting means. The exhaust gas after-treatment device is disposed in an exhaust passage. The outlet gas temperature sensing means senses outlet gas temperature of the exhaust gas downstream of the exhaust gas after-treatment device. The temperature estimating means calculates estimated temperature of the exhaust gas after-treatment device from an output of the outlet gas temperature sensing means. The state detecting means determines whether the exhaust gas after-treatment device is in a predetermined state, based on the estimated temperature calculated by the temperature estimating means. The temperature estimating means calculates the estimated temperature of the exhaust gas after-treatment device with the use of an inverse transfer function of a change in the outlet gas temperature with respect to a change in the temperature of the exhaust gas after-treatment device.

The temperature (the outlet gas temperature) of the exhaust gas downstream of the exhaust gas after-treatment device such as a catalyst or a DPF, at which exothermic reaction occurs, reflects the change in the temperature at the center of the device. Accurate temperature estimation can be performed relatively easily by using the inverse transfer function of the change in the outlet gas temperature with respect to the change in the temperature of the exhaust gas after-treatment device. Thus, it can be determined whether the state of the exhaust gas after-treatment device is in a proper temperature range, based on the estimated temperature. The exhaust gas after-treatment device is controlled based on the result of the determination. Thus, the device can be maintained in an optimum state and the exhaust gas can be cleaned safely and efficiently. As a result, the credibility of the system is improved.

According to another aspect of the present invention, an exhaust gas cleaning system for an internal combustion engine has an exhaust gas after-treatment device, an inlet gas temperature sensor, an outlet gas temperature sensor, first temperature estimating means, second temperature estimating means, and state detecting means. The exhaust gas after-treatment device is disposed in an exhaust passage of the engine. The inlet gas temperature sensor senses inlet gas temperature of exhaust gas upstream of the exhaust gas after-treatment device. The outlet gas temperature sensor senses outlet gas temperature of the exhaust gas downstream of the exhaust gas after-treatment device. The first temperature estimating means calculates first estimated temperature of the exhaust gas after-treatment device from an output of the inlet gas temperature sensor. The second temperature estimating means calculates second estimated temperature of the exhaust gas after-treatment device from an output of the outlet gas temperature sensor. The state detecting means determines whether the exhaust gas after-treatment device is in a predetermined state, based on the first estimated temperature calculated by the first temperature estimating means and the second estimated temperature calculated by the second temperature estimating means. The first temperature estimating means calculates the first estimated temperature of the exhaust gas after-treatment device with the use of a transfer function of a change in the temperature of the exhaust gas after-treatment device with respect to a change in the inlet gas temperature. The second temperature estimating means calculates the second estimated temperature of the exhaust gas after-treatment device with the use of an inverse transfer function of a change in the outlet gas temperature with respect to the change in the temperature of the exhaust gas after-treatment device.

The first estimated temperature calculated by the first temperature estimating means does not reflect the effect of heat generation at the exhaust gas after-treatment device. The second estimated temperature calculated by the second temperature estimating means reflects the effect of the heat generation at the exhaust gas after-treatment device. Therefore, the state of the exhaust gas after-treatment device can be accurately determined by comparing the first estimated temperature with the second estimated temperature. In this case, the first estimated temperature and the second estimated temperature can be calculated relatively simply with the use of the transfer function and the inverse transfer function respectively. Effects of deviation in changing timing of the temperature and gradual change in the outlet gas temperature due to a change in an operating state can be eliminated by comparing the first estimated temperature with the second estimated temperature. Thus, the change in the temperature can be sensed accurately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
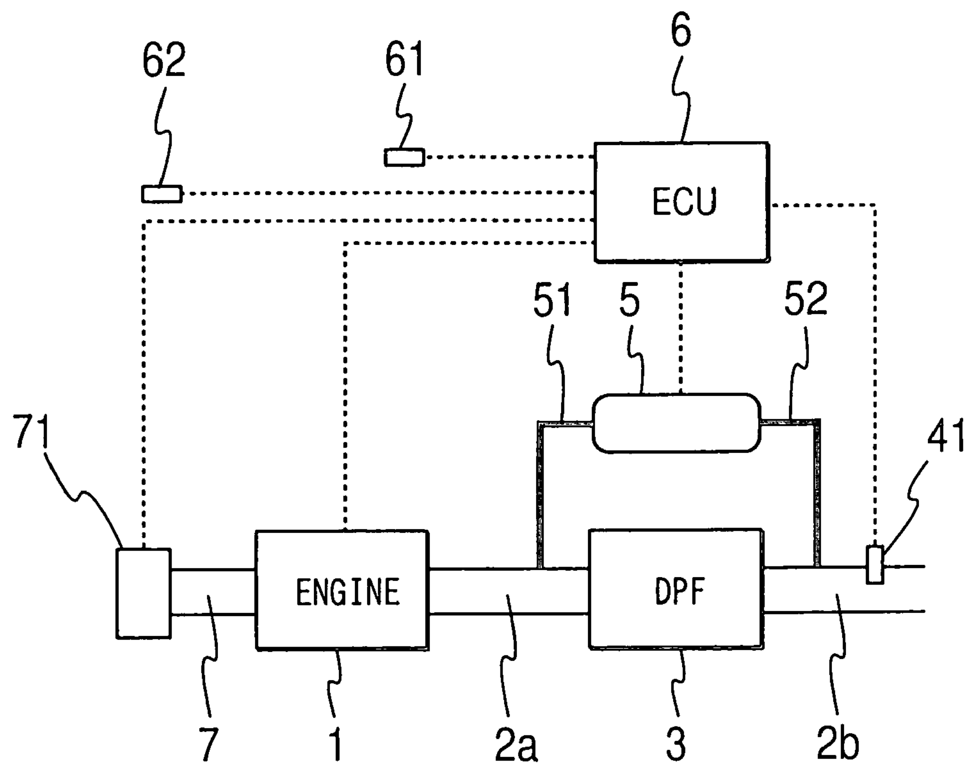
FIG. 1 is a schematic diagram showing an exhaust gas cleaning system for an internal combustion engine according to a first embodiment of the present invention.

Referring to FIG. 1, an exhaust gas cleaning system for a diesel engine 1 according to the first embodiment of the present invention is illustrated. In an exhaust passage of the engine 1, a diesel particulate filter (DPF) 3 having an oxidation catalyst as an exhaust gas after-treatment device is disposed between an upstream exhaust pipe 2*a* and a downstream exhaust pipe 2*b*. The DPF 3 is formed of heat-resistant ceramics such as cordierite in the shape of a honeycomb having a multiplicity of cells as exhaust gas passages, which are provided by filter walls. An inlet or an outlet of each cell is blocked alternately. The oxidation catalyst such as platinum is applied to surfaces of the filter walls of the cells. The exhaust gas discharged from the engine 1 flows downstream while passing through the porous filter wall of the DPF 3. Thus, particulate matters included in the exhaust gas are collected and accumulated in the DPF 3 gradually.

An exhaust gas temperature sensor 41 as outlet gas temperature sensing means for sensing the temperature of the DPF 3 is disposed in the exhaust pipe 2*b* downstream of the DPF 3. The exhaust gas temperature sensor 41 is connected with an engine control unit (ECU) 6. The exhaust gas temperature sensor 41 senses the outlet gas temperature of the DPF 3 (the temperature of the exhaust gas flowing out of the DPF 3) and outputs a signal corresponding to the sensed temperature to the ECU 6. An airflow meter (intake airflow rate sensor) 71 is disposed in an intake pipe 7 of the engine 1. The airflow meter 71 senses a flow rate of the intake air and outputs a signal corresponding to the intake airflow rate to the ECU 6.

A pressure difference sensor 5 for sensing a pressure difference between an upstream side and a downstream side of the DPF 3 is connected to the exhaust pipes 2*a*, 2*b* for estimating a quantity of the particle matters collected by the DPF 3, or a PM collection quantity. One end of the pressure difference sensor 5 is connected to the exhaust pipe 2*a* upstream of the DPF 3 through a pressure introduction pipe 51. The other end of the pressure difference sensor 5 is connected to the exhaust pipe 2*b* downstream of the DPF 3 through a pressure introduction pipe 52. The pressure difference sensor 5 outputs a signal corresponding to the pressure difference between the upstream side and the downstream side of the DPF 3 to the ECU 6.

Furthermore, the ECU 6 is connected with various sensors such as an accelerator position sensor 61 and a rotation speed sensor 62. The ECU 6 detects an operating state of the engine 1 based on the detection signals from the various sensors. The ECU 6 calculates optimum fuel injection quantity, injection timing, injection pressure and the like in accordance with the operating state of the engine 1, and performs feedback control of the engine 1.

The ECU 6 has temperature estimating means for calculating estimated temperature at the center of the DPF 3 (DPF central temperature) based on the output values of the exhaust gas temperature sensor 41 and the airflow meter 71.

The ECU 6 has state detecting means for determining whether the DPF 3 is in a predetermined range of the temperature, based on the estimated DPF central temperature. The ECU 6 has controlling means for performing excessive temperature increase prevention control of the DPF 3 for preventing excessive increase in the temperature of the DPF 3. The state detecting means of the ECU 6 calculates the quantity of the particle matters accumulated in the DPF 3 (PM collection quantity) based on the DPF central temperature and the output values of the pressure difference sensor 5 and the airflow meter 71. The state detecting means of the ECU 6 determines whether the PM collection quantity is greater than a predetermined value. The controlling means of the ECU 6 controls the regeneration of the DPF 3.

Next, an estimating method of the DPF central temperature performed by the temperature estimating means will be explained.

Figure 2:
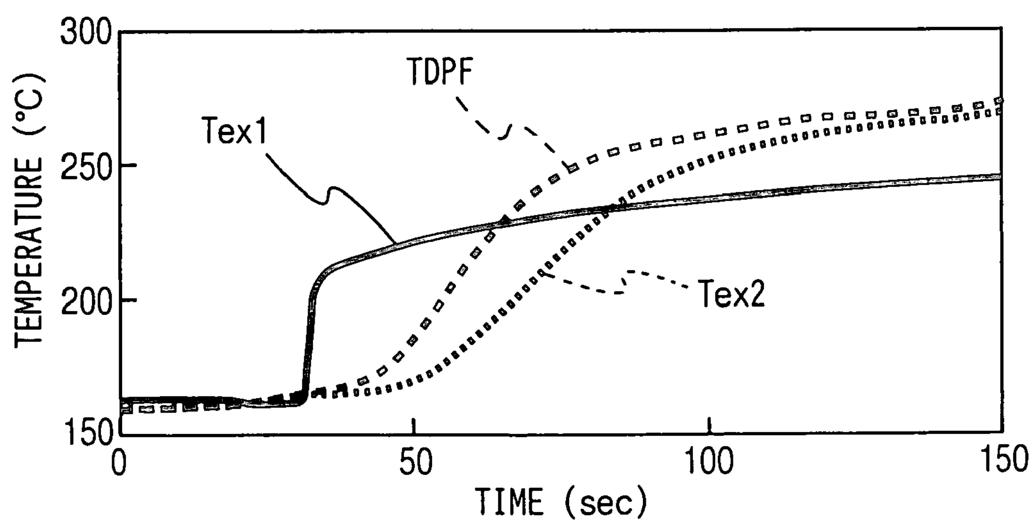
FIG. 2 is a graph showing changes in DPF central temperature and outlet gas temperature when inlet gas temperature of a DPF having an oxidation catalyst changes.

FIG. 2 shows changes in inlet gas temperature (temperature of the exhaust gas flowing into the DPF 3) Tex1, the DPF central temperature (the temperature of the DPF, the DPF temperature) TDPF and the outlet gas temperature Tex2 in the case where the fuel injection quantity is changed (increased) stepwise while the engine rotation speed is constant. As shown in FIG. 2, even if the inlet gas temperature Tex1 increases, the DPF temperature TDPF and the outlet gas temperature Tex2 do not increase immediately. Afterward, the DPF temperature TDPF and the outlet gas temperature Tex2 increase gradually. It is because the DPF 3 is made of a ceramic structural body having a large heat capacity. If the exhaust gas includes a large amount of the hydrocarbon, the DPF temperature TDPF and the outlet gas temperature Tex2 become higher than the inlet gas temperature Tex1 because of heat generation caused by oxidization and combustion of the hydrocarbon at the oxidation catalyst supported on the DPF 3.

Therefore, the DPF temperature TDPF cannot be sensed properly from the inlet gas temperature Tex1, since the heat is generated at the DPF 3. On the other hand, the outlet gas temperature Tex2 follows the change in the DPF temperature TDPF relatively well. However, there is time lag between the changes in the DPF temperature TDPF and the outlet gas temperature Tex2 as shown in FIG. 2. In an example shown in FIG. 2, there is a transitional period of tens of seconds since the inlet gas temperature Tex1 starts changing until the outlet gas temperature Tex2 substantially coincides with the DPF temperature TDPF. If the state of the catalyst is determined or the PM collection quantity is calculated with the use of the outlet gas temperature Tex2 as the DPF temperature, controllability is degraded in the transitional period.

Figure 3A:
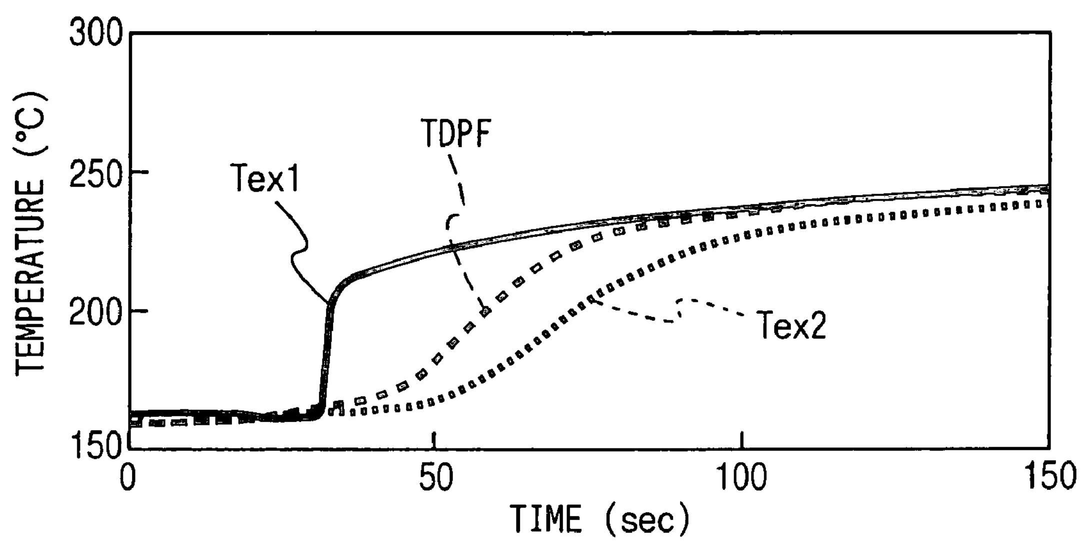
FIG. 3A is a graph showing relationships among the inlet gas temperature, the DPF central temperature and the outlet gas temperature in the case where little heat is generated at the DPF having the oxidation catalyst.
Figure 3B:
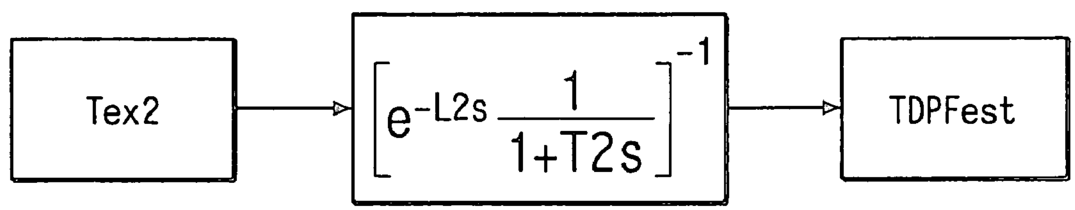
FIG. 3B is a diagram showing a method for calculating the DPF central temperature.

Therefore, in the present embodiment, focusing attention on the outlet gas temperature Tex2, which reflects the effect of the reaction heat generated by the oxidation-catalyst, a relationship between the outlet gas temperature Tex2 and the DPF temperature TDPF is expressed by a simple transfer function. Thus, the DPF temperature TDPF can be calculated from the outlet gas temperature Tex2 accurately. For the sake of conciseness, the changes in the inlet gas temperature Tex1, the DPF temperature TDPF and the outlet gas temperature Tex2 in the case where quantity of the hydrocarbon included in the exhaust gas is small and little heat is generated at the DPF 3 are shown in FIG. 3A. As shown in FIG. 3A, after the DPF temperature TDPF starts increasing, the outlet gas temperature Tex2 does not change for a while, and then, the outlet gas temperature Tex2 increases. However, a pace of the increase in the outlet gas temperature Tex2 is smaller than that of the DPF temperature TDPF. Therefore, the relationship between the DPF temperature TDPF and the outlet gas temperature Tex2 can be expressed with a simple combination of first-order lag and dead time. Based on the relationship, the DPF central temperature can be estimated with the use of an inverse transfer function of the change in the outlet gas temperature Tex2 with respect to the change in the DPF temperature TDPF as shown in FIG. 3B. In FIG. 3B, T2 represents a time constant of the first-order lag, and L2 represents the dead time, and TDPFest represents the estimated DPF central temperature.

Figure 4A:
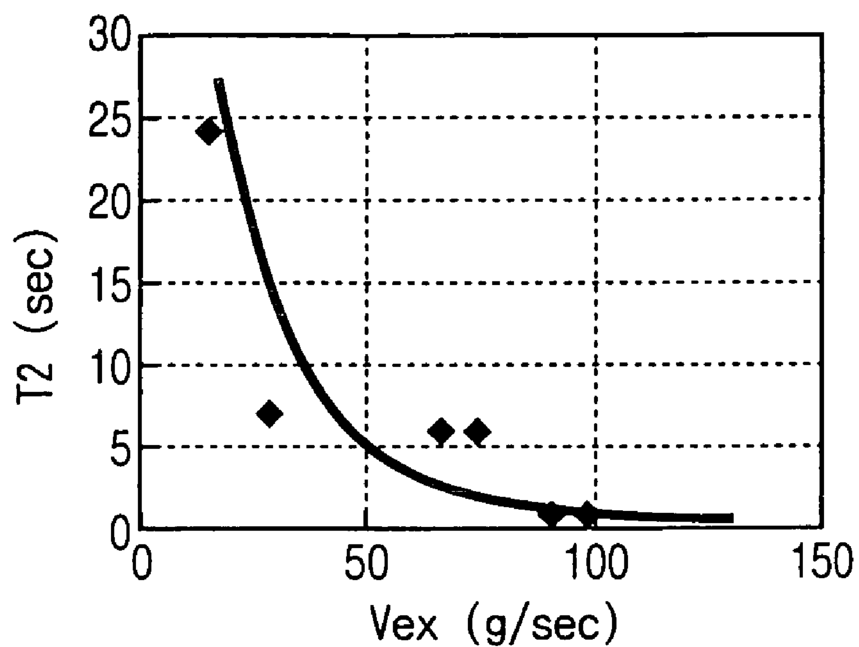
FIG. 4A is a graph showing a relationship between a time constant of the change in the outlet gas temperature with respect to the change in the DPF central temperature and a flow rate of the exhaust gas.
Figure 4B:
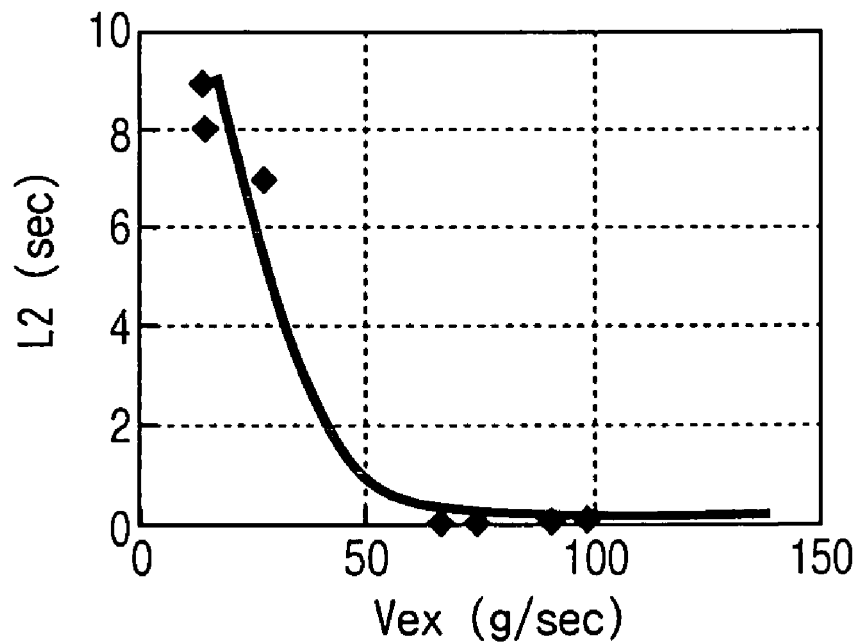
FIG. 4B is a graph showing a relationship between dead time of the change in the outlet gas temperature with respect to the change in the DPF central temperature and the flow rate of the exhaust gas.

The time constant T2 of the first-order lag and the dead time L2 can be calculated based on the graph shown in FIG. 3A. However, the relationship shown in FIG. 3A changes with a flow rate Vex of the exhaust gas. The time constant T2 and the dead time L2 change in accordance with the exhaust gas flow rate Vex as shown in graphs in FIGS. 4A and 4B. The graphs shown in FIGS. 4A and 4B are acquired through experimentation by changing the exhaust gas flow rate Vex. The time constant T2 and the dead time L2 decrease as the exhaust gas flow rate Vex increases. It is because heat transfer per unit time between the exhaust gas and the DPF 3 increases as the exhaust gas flow rate Vex increases. In a range where the exhaust gas flow rate Vex is higher than a certain value, the time constant T2 and the dead time L2 substantially stay constant. Therefore, the temperature estimating means of the ECU 6 calculates the exhaust gas flow rate Vex first, and then, the temperature estimating means changes the setting values of the time constant T2 of the first-order lag and the dead time L2 in accordance with the exhaust gas flow rate Vex. Meanwhile, the temperature estimating means estimates the DPF temperature TDPF with the use of the setting values of the time constant T2 of the first-order lag and the dead time L2 and the inverse transfer function shown in FIG. 3B.

Figure 5:
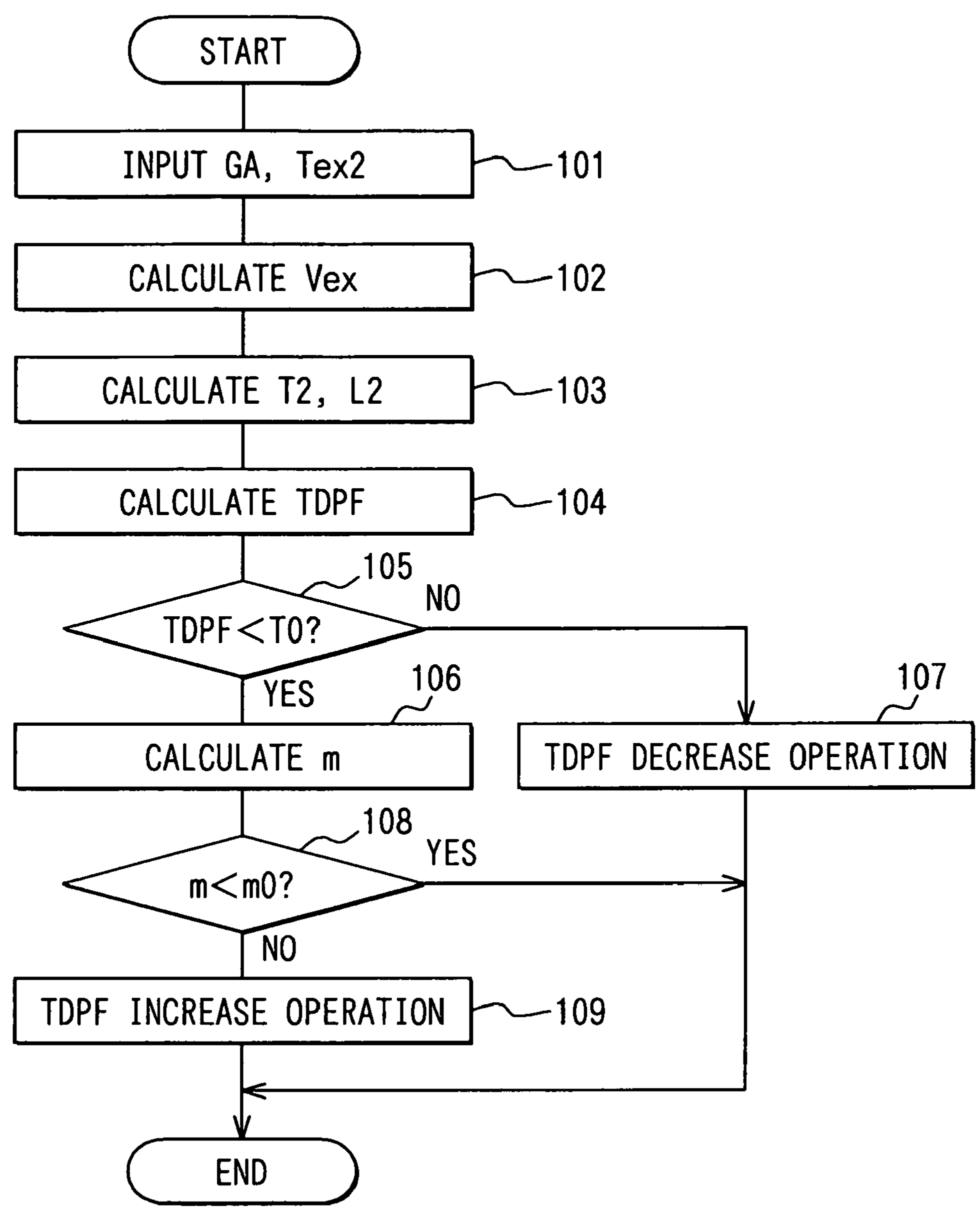
FIG. 5 is a flowchart showing excessive temperature increase prevention control and regeneration control performed by an ECU according to the first embodiment.

Next, an example of operation of the ECU 6 will be explained based on a flowchart shown in FIG. 5. The ECU 6 performs the processing shown by the flowchart in FIG. 5 in a predetermined cycle. First, in Step 101, an intake airflow rate GA is inputted from the airflow meter 71, and the outlet gas temperature Tex2 of the DPF 3 is inputted from the exhaust gas temperature sensor 41. Then, in Step 102, the exhaust gas flow rate Vex is calculated from the intake airflow rate GA. The exhaust gas flow rate Vex is calculated in the mass flow rate (g/sec). The airflow meter 71 measures the mass flow rate (g/sec) of the intake air, normally. Therefore, the intake airflow rate GA coincides with the exhaust gas flow rate Vex.

In Step 103, the time constant T2 of the first-order lag and the dead time L2 at the exhaust gas flow rate Vex calculated in Step 102 are calculated. The ECU 6 stores the relationship between the exhaust gas flow rate Vex and the time constant T2 or the dead time L2 as a map in advance as shown in FIGS. 4A and 4B. The ECU 6 calculates the time constant T2 and the dead time L2 based on the map in Step 103. Then, in Steps 104, the ECU 6 calculates the DPF central temperature TDPF of the DPF 3 based on the inverse transfer function in accordance with the time constant T2 and the dead time L2 calculated in Step 103.

In Step 105, it is determined whether the DPF central temperature TDPF of the DPF 3 calculated in Step 104 is lower than a predetermined permissible temperature T0. The permissible temperature T0 is set to a certain temperature (for instance, 800° C.), above which the oxidation catalyst supported by the DPF 3 may be degraded. If the result of the determination in Step 105 is "YES", it is determined that the DPF 3 is in the permissible temperature range, and the processing proceeds to Step 106. If the result of the determination in Step 105 is "NO", the processing proceeds to Step 107. In Step 107, temperature decreasing operation (TDPF decrease operation) of the DPF 3 for decreasing the DPF central temperature TDPF is performed in order to prevent the degradation of the oxidation catalyst caused by excessive temperature increase.

The TDPF decrease operation in Step 107 is performed by fully opening an intake throttle to increase the exhaust gas flow rate Vex, for instance. Thus, the DPF 3 is cooled. Alternatively, if temperature increasing operation (TDPF increase operation) for increasing the DPF temperature TDPF to regenerate the DPF 3 has been performed, the TDPF decrease operation can be performed by stopping the temperature increasing operation, for instance. Thus, the excessive increase in the DPF temperature TDPF above the permissible temperature T0 can be prevented. Then, the processing is ended once.

In Step 106, the PM collection quantity m of the particulate matters collected in the DPF 3 is calculated. The PM collection quantity m is calculated in accordance with the intake airflow rate GA, the DPF central temperature TDPF of the DPF 3 calculated in Step 104, and the pressure difference P between the upstream side and the downstream side of the DPF 3 sensed by the pressure difference sensor 5 based on a map stored in the memory of the ECU 6 in advance. Generally, the pressure difference P sensed by the pressure difference sensor 5 increases as the quantity of the particulate matters collected in the DPF 3 increases. Even if the PM collection quantity m is identical, the sensed value of the pressure difference P varies in accordance with a volumetric flow rate Vex' (L/min) of the exhaust gas. Therefore, the PM collection quantity m can be calculated by acquiring the above relationships in advance through experimentation and the like. The volumetric flow rate Vex' (L/min) of the exhaust gas can be calculated by converting the intake airflow rate GA (g/sec) into the volumetric flow rate (L/min) with the use of the DPF central temperature TDPF and the pressure difference P.

In Step 108, it is determined whether the PM collection quantity m calculated in Step 106 is less than permissible PM collection quantity m0. The permissible PM collection quantity m0 is a predetermined quantity (for instance, 10 g), which is determined in advance in order to prevent decrease of output of the engine 1 due to the increase in the PM collection quantity m, or damage to the oxidation catalyst or the filter base material. The damage to the oxidation catalyst or the filter base material is caused if a large amount of the particulate matters is burned. If the result of the determination in Step 108 is "YES", it is determined that the regeneration is unnecessary, and the processing is ended once. If the result of the determination in Step 108 is "NO", the processing proceeds to Step 109, and the temperature increasing operation for regenerating the DPF 3 is performed.

More specifically, post injection is performed or the injection timing is delayed when the fuel is injected to the combustion chamber from a fuel injection valve 12 in the temperature increasing operation preformed in Step 109 for regenerating the DPF 3. If the post injection is performed or the injection timing is delayed, the temperature of the exhaust gas is increased compared to the case of the normal injection. Meanwhile, the unburned hydrocarbon is supplied into the DPF 3 and is oxidized by the oxidation catalyst. As a result, the temperature of the exhaust gas increases further. Thus, the temperature of the DPF 3 can be increased above a predetermined temperature (for instance, 600° C.). Thus, the depositing particulate matters can be combusted and eliminated, and collecting ability of the DPF 3 can be regenerated. Other methods may be employed to perform the temperature increasing operation, or a suitable method for the temperature increasing operation may be selected from a plurality of methods in accordance with the operating state.

Figure 6:
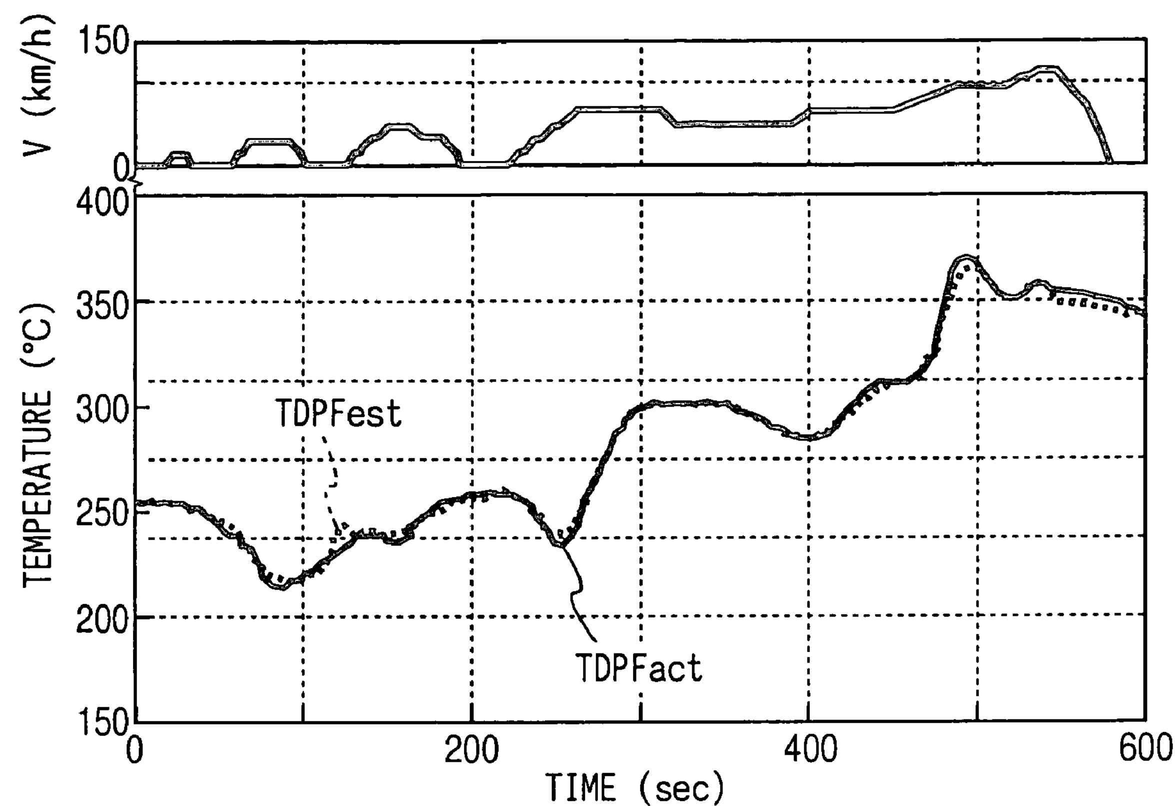
FIG. 6 is a time chart showing estimated DPF central temperature and the actual DPF central temperature according to the first embodiment.

In a time chart shown in FIG. 6, the actual DPF central temperature TDPFact of the DPF 3 is compared with the estimated DPF central temperature TDPFest calculated from the outlet gas temperature Tex2. In FIG. 6, a broken line TDPFest represents the estimated DPF central temperature of the DPF 3 and a solid line TDPFact represents the actual DPF central temperature of the DPF 3. If the vehicle velocity V is changed as shown in FIG. 6, the actual DPF central temperature TDPFact changes in accordance with the change in the vehicle velocity V. As shown in FIG. 6, the estimated DPF central temperature TDPFest does not deviate from the actual DPF central temperature TDPFact largely. Thus, it is verified that the temperature estimating means of the present embodiment can estimate the DPF central temperature with extremely high accuracy.

Thus, in the present embodiment, the central temperature of the DPF 3 can be estimated very accurately with the use of the simple transfer function. Therefore, it can be determined very accurately whether the DPF 3 is in the proper temperature range. If the DPF central temperature TDPF exceeds the permissible temperature T0, the temperature decreasing operation is performed immediately in order to prevent the excessive temperature increase of the DPF 3. Thus, the degradation of the catalyst and the damage to the filter base material can be prevented, so the durability of the DPF 3 can be improved. In the case where the estimating accuracy of the temperature is low, there is a possibility that the temperature increasing operation is stopped even if the actual temperature is lower than the permissible temperature T0 during the regeneration of the DPF 3. In that case, the particulate matters cannot be eliminated sufficiently. As a result, frequency of the regeneration is increased. On the contrary, the increase in the frequency of the regeneration can be prevented in the present embodiment because the temperature can be estimated accurately.

In addition, since the ECU 6 of the present embodiment can estimate the temperature accurately, unnecessary temperature increasing operation (the post injection) is not performed, so the deterioration of the fuel consumption can be prevented.

Moreover, since the estimated central temperature of the DPF 3 is used in the calculation of the PM collection quantity during the regeneration control, the accuracy of the calculation of the PM collection quantity m is improved. Therefore, it can be accurately determined whether the PM collection quantity m is in the permissible range. If the PM collection quantity m exceeds the predetermined permissible PM collection quantity m0, the temperature increasing operation of the DPF 3 is performed to eliminate the particulate matters by combustion. Thus, the regeneration control can be performed efficiently.

In the first embodiment, as the exhaust gas after-treatment device, the DPF 3 having the oxidation catalyst is used. Even in the case where a DPF having a catalyst other than the oxidation catalyst or a DPF having no catalyst is used, the central temperature of the DPF can be estimated from the outlet gas temperature likewise. High exhaust gas cleaning performance can be achieved by performing the excessive temperature increase prevention control and the regeneration control based on the estimated temperature, while protecting the catalyst and the DPF. A catalyst such as the oxidation catalyst, a NOx removal catalyst or a three-way catalyst can be used as the exhaust gas after-treatment device, other than the DPF. Also in that case, the similar effect can be achieved by performing the excessive temperature increase prevention control based on the central temperature of the device estimated likewise. The exhaust gas after-treatment device may be a combination of a plurality of catalysts and the DPF.

(Second Embodiment)

Figure 7:
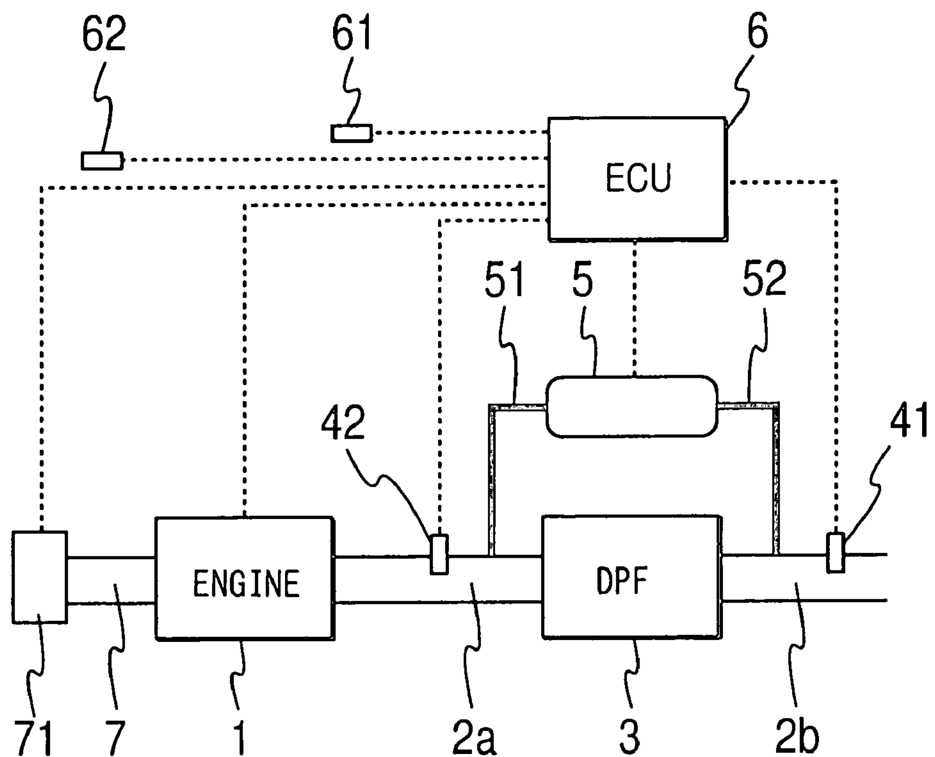
FIG. 7 is a schematic diagram showing an exhaust gas cleaning system for an internal combustion engine according to a second embodiment of the present invention.

Next, an exhaust gas cleaning system according to the second embodiment will be explained based on FIG. 7. As shown in FIG. 7, an exhaust gas temperature sensor 42 as inlet gas temperature sensing means is disposed in the exhaust pipe **2*a* upstream of the DPF 3 having the, oxidation catalyst. The exhaust gas temperature sensor 42 senses the inlet gas temperature of the DPF 3 and outputs a signal corresponding to the inlet gas temperature to the ECU 6**. The exhaust gas cleaning system of the second embodiment determines the degradation of the oxidation catalyst based on estimated values of the DPF central temperature calculated from the outlet gas temperature and the inlet gas temperature.

The ECU 6 of the second embodiment has second temperature estimating means for calculating the estimated central temperature of the DPF 3, which reflects the effect of the heat generation caused by the catalytic reaction, based on the output values of the exhaust gas temperature sensor 41 downstream of the DPF 3 and the airflow meter 71. The estimated central temperature of the DPF 3, which is calculated based on the output values of the exhaust gas temperature sensor 41 and the airflow meter 71, is referred to as second estimated temperature (a second estimate TDPFest2), hereafter. The ECU 6 has first temperature estimating means for calculating the estimated central temperature of the DPF 3, which is free from the effect of the heat generation caused by the catalytic reaction, based on the output values of the exhaust gas temperature sensor 42 upstream of the DPF 3 and the airflow meter 71. The estimated central temperature of the DPF 3, which is calculated based on the output values of the exhaust gas temperature sensor 42 and the airflow meter 71, is referred to as first estimated temperature (a first estimate TDPFest1), hereafter. The first and second estimates TDPFest1, TDPFest2 are calculated in a state in which the collected particulate matters are not combusted for elimination. The ECU 6 has state detecting means or degradation determining means for measuring temperature increase caused by the catalytic reaction by calculating a difference between the first estimate TDPFest1 and the second estimate TDPFest2. If the difference is less than a predetermined value, the state detecting means or the degradation determining means determines that the oxidation catalyst is degraded.

Figure 8A:
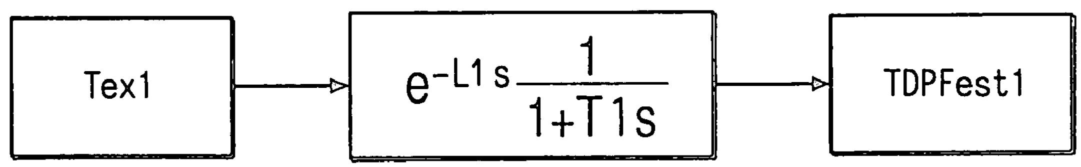
FIG. 8A is a diagram showing a method for calculating first estimated temperature at the center of a DPF according to the second embodiment.
Figure 8B:
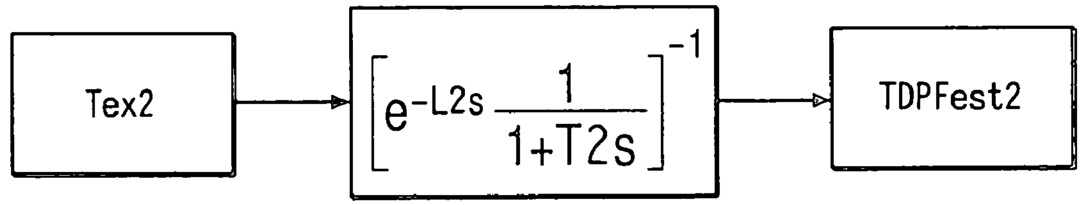
FIG. 8B is a diagram showing a method for calculating second estimated temperature at the center of the DPF according to the second embodiment.
Figure 9A:
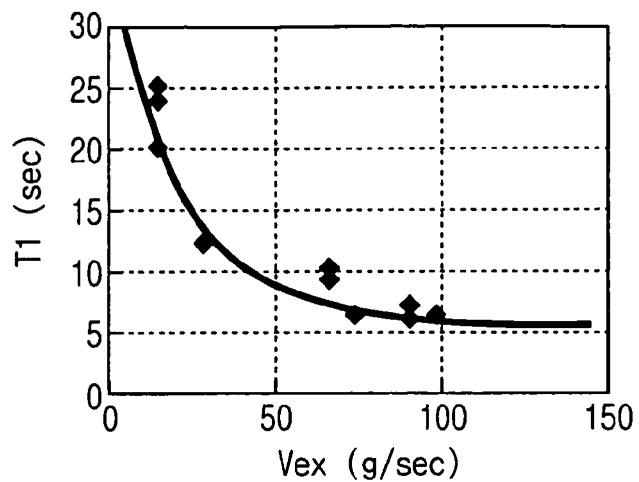
FIG. 9A is a graph showing a relationship between a time constant of the change in the DPF central temperature with respect to the change in the inlet gas temperature and the flow rate of the exhaust gas.
Figure 9B:
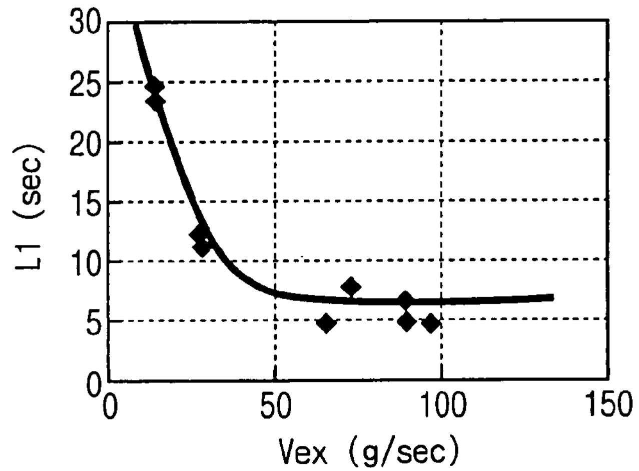
FIG. 9B is a graph showing a relationship between dead time of the change in the DPF central temperature with respect to the change in the inlet gas temperature and the flow rate of the exhaust gas.

A method for determining the degradation by comparing the outputs of the exhaust gas temperature sensors upstream and downstream of the catalyst is already known. However, the degradation cannot be determined accurately by merely comparing the temperature difference between the outputs of the two exhaust gas temperature sensors. It is because the catalyst disposed between the two exhaust gas temperature sensors is formed of a ceramic structural body having a large heat capacity. If the operating state changes because of acceleration, deceleration or the like, the changing timing of the outlet gas temperature Tex2 deviates from that of the inlet gas temperature Tex1 and the outlet gas temperature Tex2 changes more gradually than the inlet gas temperature Tex1 as shown in FIG. 2. In the present embodiment, considering these points, the relationships among the changes of the inlet gas temperature Tex1, the DPF central temperature TDPF and the outlet gas temperature Tex2 are expressed with a combination of the first-order lag and the dead time, like the first embodiment. The first and second estimates TDPFest1, TDPFest2 are calculated from the inlet gas temperature Tex1 and the outlet gas temperature Tex2 respectively based on a transfer function and an inverse transfer function shown in FIGS. 8A and 8B. Then, the effects of the deviation in the changing timing of the temperature and the gradual change in the outlet gas temperature Tex2 are canceled by comparing the first estimate TDPFest1 with the second estimate TDPFest2. In FIGS. 8A and 8B, T1, T2 represent the time constants of the first-order lag and L1, L2 represent the dead time.

More specifically, the second temperature estimating means calculates the estimated central temperature of the DPF 3 (the second estimate TDPFest2) from the outlet gas temperature Tex2 with the use of the inverse transfer function (shown in FIG. 8B) of the change in the outlet gas temperature Tex2 with respect to the change in the DPF central temperature TDPF. The second estimate TDPFest2 reflects the effect of the reaction heat generated by the oxidation catalyst as explained in the first embodiment. On the other hand, the first temperature estimating means calculates the estimated central temperature of the DPF 3 (the first estimate TDPFest1) from the inlet gas temperature Tex1 with the use of the transfer function (shown in FIG. 8A) of the change in the DPF central temperature TDPF with respect to the change in the inlet gas temperature Tex1. The first estimate TDPFeat1 does not reflect the effect of the reaction heat generated by the oxidation catalyst. Therefore, the effects of the deviation in the changing timing of the temperature and the gradual change in the outlet gas temperature Tex2 can be eliminated by calculating a difference between the first and second estimates TDPFest1, TDPFest2. Thus, the change in the temperature between the upstream side and the downstream side of the DPF 3 caused by the catalytic reaction can be measured accurately.

Also in the second embodiment, the time constants T1, T2 of the first-order lag and the dead time L1, L2 are changed in accordance with the exhaust gas flow rate Vex, considering the fact that the heat transfer between the exhaust gas and the DPF 3 increases as the exhaust gas flow rate Vex increases. As shown in FIGS. 4A, 4B, 9A and 9B, the time constants T1, T2 and the dead time L1, L2 are decreased as the exhaust gas flow rate Vex increases.

Figure 10:
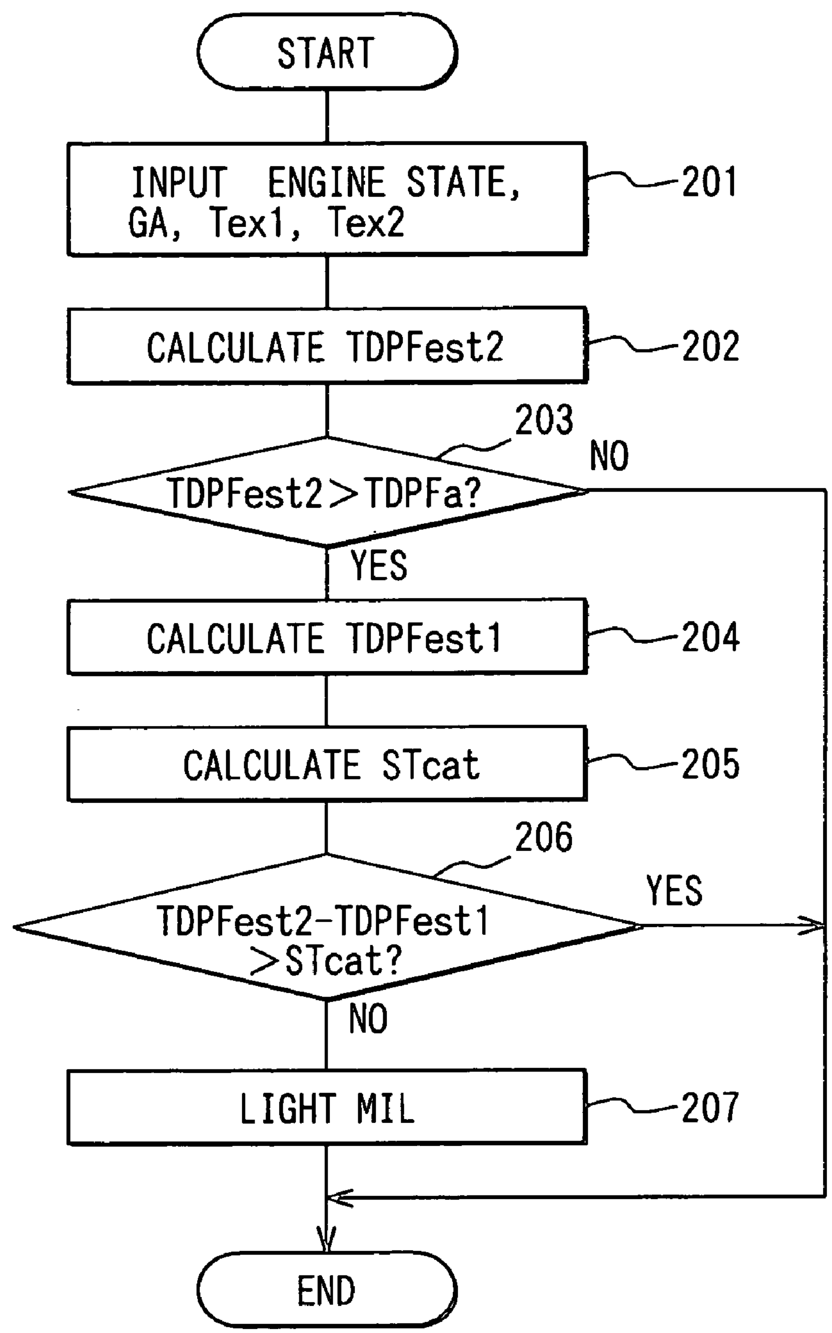
FIG. 10 is a flowchart showing catalyst degradation determination control performed by an ECU according to the second embodiment.

Next, an example of operation of the ECU 6 according to the second embodiment will be explained based on a flowchart shown in FIG. 10. The ECU 6 performs the processing shown by the flowchart in FIG. 10 in a predetermined cycle. First, an operating state of the engine 1 is detected from the outputs of the various sensors in Step 201. Meanwhile, the intake airflow rate GA, the inlet gas temperature Tex1 and the outlet gas temperature Tex2 are inputted from the airflow meter 71, the exhaust gas temperature sensor 42 and the exhaust gas temperature sensor 41 respectively in Step 201. Then, the second estimate TDPFest2 of the DPF temperature is calculated from the outlet gas temperature Tex2 in Step 202. Step 202 corresponds to the steps from Step 102 to Step 104 in the flowchart shown in FIG. 5. In Step 202, the exhaust gas flow rate Vex is calculated from the intake airflow rate GA. Then, the time constant T2 of the first-order lag and the dead time L2 at the exhaust gas flow rate Vex are calculated based on the graphs shown in FIGS. 4A and 4B. Then, the second estimate TDPFest2 is calculated based on the inverse transfer function shown in FIG. 8B.

In Step 203, it is determined whether the second estimate TDPFest2 calculated in Step 202 is higher than a predetermined value TDPFa. The predetermined value TDPFa is set to an activation temperature (for instance, 200° C.) of the oxidation catalyst supported on the DPF 3. If the result of the determination in Step 203 is "YES", it is determined that the temperature of the DPF 3 is higher than the activation temperature TDPFa, and the processing proceeds to Step 204. If the result of the determination in Step 203 is "NO", it is determined that the oxidation catalyst is not activated. In that case, the temperature increase due to the catalytic reaction heat cannot be measured. Therefore, the processing is ended immediately.

Figure 11:
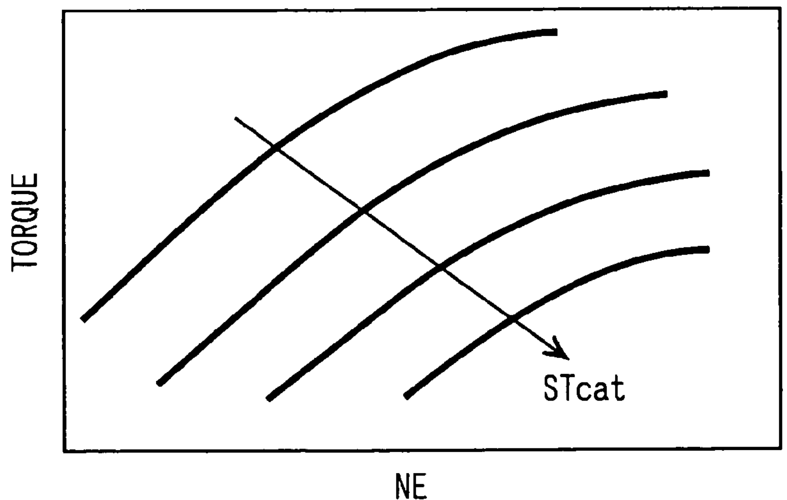
FIG. 11 is a graph showing a standard value for the catalyst degradation determination control performed by the ECU according to the second embodiment.

In Step 204, the first estimate TDPFest1 of the DPF temperature is calculated from the inlet gas temperature Tex1 of the DPF 3. First, the time constant T1 of the first-order lag and the dead time L1 at the exhaust gas flow rate Vex calculated in Step 202 are calculated based on graphs shown in FIGS. 9A and 9B. Then, the first estimate TDPFest1 is calculated based on the transfer function shown in FIG. 8A. Then, in Step 205, a standard value STcat for the degradation determination of the oxidation catalyst is calculated from the operating state of the engine 1 such as the engine rotation speed NE, torque or fuel injection quantity. The quantity of the unburned hydrocarbon included in the exhaust gas changes in accordance with the operating state of the engine 1. As a result, an expected value of temperature increase due to the catalytic reaction changes in accordance with the operating state of the engine 1. The standard value STcat is increased as the expected value of the temperature increase increases. A map used in the calculation of the standard value STcat is acquired in advance through experimentation and the like and is stored in the memory of the ECU 6. For instance, the standard value STcat changes in accordance with the engine rotation speed NE and the torque as shown in FIG. 11. In FIG. 11, the standard value STcat increases along the arrow mark.

In Step 206, a difference between the first estimate TDPFext1 and the second estimate TDPFest2 is calculated, and the difference is compared with the standard value STcat calculated in Step 205. If the difference provided by subtracting the first estimate TDPFest1 from the second estimate TDPFest2 is greater than the standard value STcat, it is determined that the temperature increase of the DPF 3 due to the reaction at the oxidation catalyst is higher than a predetermined expected value and that the oxidation catalyst is not degraded. Then, the processing is ended. If the result of the determination in Step 206 is "NO", it is determined that the temperature increase is lower than the expected value and that the catalyst does not function sufficiently because of the degradation. Then, a breakdown warning lamp MIL is lit in Step 207.

In the second embodiment, the second estimated DPF central temperature (the second estimate TDPFest2) is calculated from the outlet gas temperature Tex2 and the first estimated DPF central temperature (the first estimate TDPFest1) is calculated from the inlet gas temperature Tex1, based on the simple transfer functions. The effect of the change in the exhaust gas temperature itself can be eliminated by comparing the first and the second estimates TDPFest1, TDPFest2. Therefore, even in the case where the operating state changes because of the acceleration, the deceleration or the like, the degradation of the catalyst can be detected accurately and can be indicated to the vehicle driver. Thus, the credibility of the system is improved largely.

During the regeneration of the DPF 3, the temperature increase is caused by the combustion of the hydrocarbon and the particulate matters. Therefore, in that case, a map different from the map shown in FIG. 11 is required for the determination. However, even during the regeneration, the degradation can be determined likewise by calculating the standard value for the degradation determination in consideration of the effect of the temperature increase due to the combustion of the hydrocarbon and the particulate matters.

In the second embodiment, as the exhaust gas after-treatment device, the DPF having the oxidation catalyst is employed. Alternatively, a DPF having a catalyst other than the oxidation catalyst, or a catalyst such as the oxidation catalyst, the NOx removal catalyst or the three-way catalyst may be employed as the exhaust gas after-treatment device. Likewise, the degradation of the catalyst can be detected accurately by comparing estimated values of central temperature of the catalyst respectively calculated from the inlet gas temperature and the outlet gas temperature, independently of the operating state.

As explained above, in the present embodiments, it can be accurately determined whether the catalyst or the DPF is in the proper temperature range, or whether the catalyst is degraded, and the engine can be controlled so that the catalyst or the DPF is in the predetermined state. In the above embodiments, the temperature estimating means of the present invention is used in the temperature control of the catalyst or the DPF, the regeneration control, the degradation determination and the like. Alternatively, the present invention may be applied to other types of control. For instance, in the first embodiment, as the excessive temperature increase prevention control, the operation for decreasing the temperature when the temperature of the exhaust gas after-treatment device exceeds a predetermined temperature is performed. Alternatively, operation for increasing the temperature in order to maintain the catalyst above the activation temperature when the temperature decreases below a predetermined temperature may be performed.

For the sake of convenience of the explanation, the central temperature of the DPF 3 is estimated based on the transfer function in the above embodiments. In actuality, the upstream side, the downstream side, the outer periphery and the inner periphery of the DPF have various temperature distributions respectively. Therefore, a substantially averaged value of the temperature at the respective portions of the DPF is estimated as the temperature of the DPF itself, in practice.

The present invention should not be limited to the disclosed embodiments, but may be implemented in many other ways without departing from the spirit of the invention.

What is claimed is:

1. An exhaust gas cleaning system for an internal combustion engine, the system comprising:

an exhaust gas after-treatment device disposed in an exhaust passage of the engine;

an outlet gas temperature sensing means for sensing outlet gas temperature of exhaust gas downstream of the exhaust gas after-treatment device;

temperature estimating means for calculating estimated temperature of the exhaust gas after-treatment device from an output of the outlet gas temperature sensing means with the use of an inverse transfer function of a change in the outlet gas temperature with respect to a change in the temperature of the exhaust gas after-treatment device; and state detecting means for determining whether the exhaust gas after-treatment device is in a predetermined state, based on the estimated temperature calculated by the temperature estimating means;

wherein the temperature estimating means uses the inverse transfer function expressed with first-order lag and dead time;

wherein the temperature estimating means changes a time constant of the first-order lag and the dead time respectively in accordance with a flow rate of the exhaust gas.

2. The exhaust gas cleaning system as in claim 1, wherein the temperature estimating means decreases the time constant of the first-order lag and the dead time respectively as the flow rate of the exhaust gas increases.

3. An exhaust gas cleaning system for an internal combustion engine, the system comprising:

an exhaust gas after-treatment device disposed in an exhaust passage of the engine;

an inlet gas temperature sensor for sensing inlet gas temperature of exhaust gas upstream of the exhaust gas after-treatment device;

an outlet gas temperature sensor for sensing outlet gas temperature of the exhaust gas downstream of the exhaust gas after-treatment device;

first temperature estimating means for calculating first estimated temperature of the exhaust gas after-treatment device from an output of the inlet gas temperature sensor with the use of a transfer function of a change in the temperature of the exhaust gas after-treatment device with respect to a change in the inlet gas temperature;

second temperature estimating means for calculating second estimated temperature of the exhaust gas after-treatment device from an output of the outlet gas temperature sensor with the use of an inverse transfer function of a change in the outlet gas temperature with respect to the change in the temperature of the exhaust gas after-treatment device;

state detecting means for determining whether the exhaust gas after-treatment device is in a predetermined state, based on the first estimated temperature calculated by the first temperature estimating means and the second estimated temperature calculated by the second temperature estimating means;

wherein the first temperature estimating means uses the transfer function expressed with first-order lag and first dead time;

the second temperature estimating means uses the inverse transfer function expressed with first-order lag and second dead time; and the first temperature estimating means changes a first time constant of the first-order lag and the first dead time respectively in accordance with a flow rate of the exhaust gas, and the second temperature estimating means changes a second time constant of the first-order lag and the second dead time respectively in accordance with the flow rate of the exhaust gas.

4. The exhaust gas cleaning system as in claim 3, wherein the first temperature estimating means decreases the first time constant of the first-order lag and the first dead time respectively as the flow rate of the exhaust gas increases, and the second temperature estimating means decreases the second time constant of the first-order lag and the second dead time respectively as the flow rate of the exhaust gas increases.

5. The exhaust gas cleaning system as in claim 3, further comprising:

a catalyst supported on a surface of the exhaust gas after-treatment device, wherein the first estimated temperature of the exhaust gas after-treatment device is free from effect of reaction heat generated by the catalyst, and the second estimated temperature of the exhaust gas after-treatment device reflects the effect of the reaction heat generated by the catalyst.

6. The exhaust gas cleaning system as in claim 5, wherein the state detecting means includes degradation determining means for determining that the catalyst is degraded when a difference between the first estimated temperature and the second estimated temperature is smaller than a predetermined value.

7. The exhaust gas cleaning system as in claim 6, wherein the state detecting means determines the predetermined value in accordance with an operating state of the engine.

8. An exhaust gas cleaning system for an internal combustion engine, the system comprising:

an exhaust gas after-treatment device disposed in an exhaust passage of the engine;

an inlet gas temperature sensor for sensing inlet gas temperature of exhaust gas upstream of the exhaust gas after-treatment device;

an outlet gas temperature sensor for sensing outlet gas temperature of the exhaust gas downstream of the exhaust gas after-treatment device;

first temperature estimating means for calculating first estimated central temperature of the exhaust gas after-treatment device from an output of the inlet gas temperature sensor with the use of a transfer function of a change in the temperature of the exhaust gas after-treatment device with respect to a change in the inlet gas temperature;

second temperature estimating means for calculating second estimated central temperature of the exhaust gas after-treatment device from an output of the outlet gas temperature sensor with the use of an inverse transfer function of a change in the outlet gas temperature with respect to the change in the temperature of the exhaust gas after-treatment device;

state detecting means for determining whether the exhaust gas after-treatment device is in a predetermined state, based on the first estimated central temperature calculated by the first temperature estimating means and the second estimated central temperature calculated by the second temperature estimating means;

a catalyst supported on a surface of the exhaust gas after-treatment device, wherein the first estimated temperature of the exhaust gas after-treatment device is free from effect of reaction heat generated by the catalyst;

the second estimated temperature of the exhaust gas after-treatment device reflects the effect of the reaction heat generated by the catalyst;

the state detecting means includes degradation determining means for determining that the catalyst is degraded when a difference between the first estimated temperature and the second estimated temperature is smaller than a predetermined value; and the state detecting means performs the determination of the degradation of the catalyst only when the outlet gas temperature sensed by the outlet gas temperature sensor is equal to or higher than activation temperature of the catalyst.

9. A method of cleaning exhaust gas in an internal combustion engine, the method comprising;

sensing an outlet gas temperature of exhaust gas downstream of an exhaust gas after-treatment device disposed in an exhaust passage of the engine;

calculating an estimated central temperature of the exhaust gas after-treatment device based on the sensed outlet gas temperature and an inverse transfer function of a change in the outlet gas temperature with respect to a change in the temperature of the exhaust gas after-treatment device; and determining whether the exhaust gas after-treatment device is in a predetermined state, based on the calculated estimated central temperature;

wherein the inverse transfer function is expressed with first-order lag and dead time; and a time constant of the first-order lag and the dead time are respectively changed in accordance with a flow rate of the exhaust gas.

10. The method as in claim 9, wherein the time constant of the first-order lag and the dead time are respectively decreased as the flow rate of the exhaust gas increases.

11. A method of cleaning exhaust gas in an internal combustion engine, the method comprising:

sensing an inlet gas temperature of exhaust gas upstream of an exhaust gas after-treatment device disposed in an exhaust passage of the engine;

sensing an outlet gas temperature of exhaust gas downstream of the exhaust gas after-treatment device;

calculating a first estimated central temperature of the exhaust gas after-treatment device based on the inlet gas temperature sensor and a transfer function of a change in the temperature of the exhaust gas after-treatment device with respect to a change in the inlet gas temperature;

calculating a second estimated central temperature of the exhaust gas after-treatment device based on the outlet gas temperature sensor and an inverse transfer function of a change in the outlet gas temperature with respect to the change in the temperature of the exhaust gas after-treatment device; and determining whether the exhaust gas after-treatment device is in a predetermined state, based on the calculated first estimated central temperature and the calculated second estimated central temperature;

wherein the transfer function is expressed with first-order lag and first dead time, and the inverse transfer function is expressed with first-order lag and second dead time; and the first time constant of the first-order lag and the first dead time are changed respectively in accordance with a flow rate of the exhaust gas, and the second time constant of the first-order lag and the second dead time are changed respectively in accordance with the flow rate of the exhaust gas.

12. The method as in claim 11, wherein the first time constant of the first-order lag and the first dead time are decreased respectively as the flow rate of the exhaust gas increases, and the second time constant of the first-order lag and the second dead time are decreased respectively as the flow rate of the exhaust gas increases.

13. A method of cleaning exhaust gas in an internal combustion engine, the method comprising;

sensing an inlet gas temperature of exhaust gas upstream of an exhaust gas after-treatment device disposed in an exhaust passage of the engine;

sensing an outlet gas temperature of exhaust gas downstream of the exhaust gas after-treatment device;

calculating a first estimated central temperature of the exhaust gas after-treatment device based on the inlet gas temperature sensor and a transfer function of a change in the temperature of the exhaust gas after-treatment device with respect to a change in the inlet gas temperature;

calculating a second estimated central temperature of the exhaust gas after-treatment device based on the outlet gas temperature sensor and an inverse transfer function of a change in the outlet gas temperature with respect to the change in the temperature of the exhaust gas after-treatment device;

determining whether the exhaust gas after-treatment device is in a predetermined state, based on the calculated first estimated central temperature and the calculated second estimated central temperature; and providing a catalyst supported on a surface of the exhaust gas after-treatment device, wherein the first estimated central temperature of the exhaust gas after-treatment device is free from effect of reaction heat generated by the catalyst, and the second estimated central temperature of the exhaust gas after-treatment device reflects the effect of the reaction heat generated by the catalyst.

14. The method as in claim 13, wherein a determination is made that the catalyst is degraded when a difference between the first estimated central temperature and the second estimated central temperature is smaller than a predetermined value.

15. The method as in claim 14, wherein the predetermined value is determined in accordance with an operating state of the engine.

16. The method as in claim 14, wherein the degradation of the catalyst is determined only when the sensed outlet gas temperature is equal to or higher than an activation temperature of the catalyst.

* * * * *